Jan. 4, 1938.  A. ADAMCZYK  2,104,577
ICE CUBE CRUSHER
Filed June 11, 1937
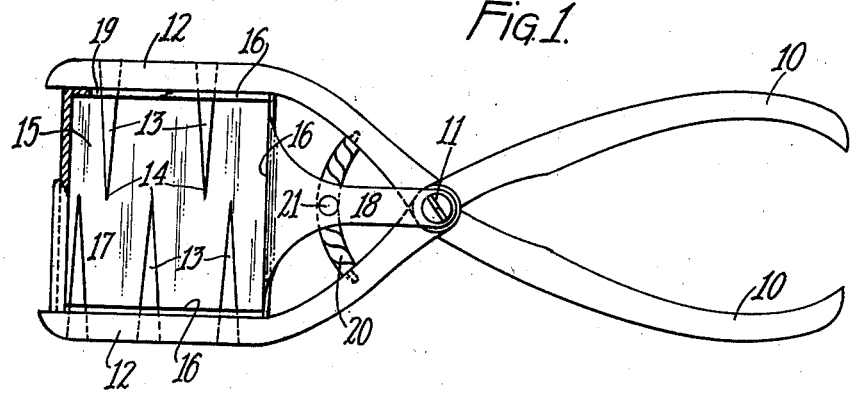
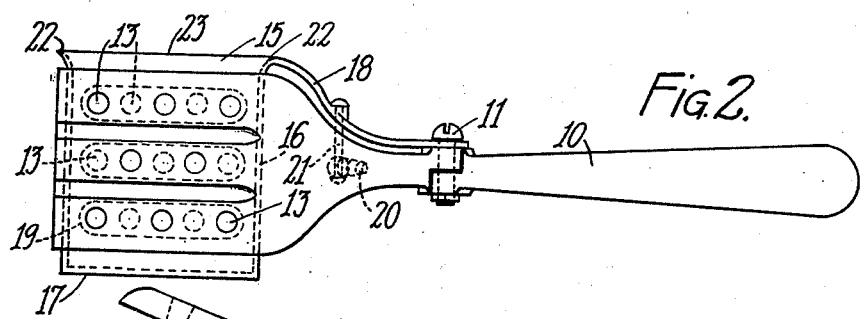
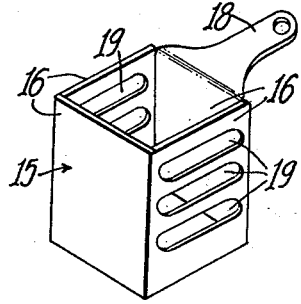
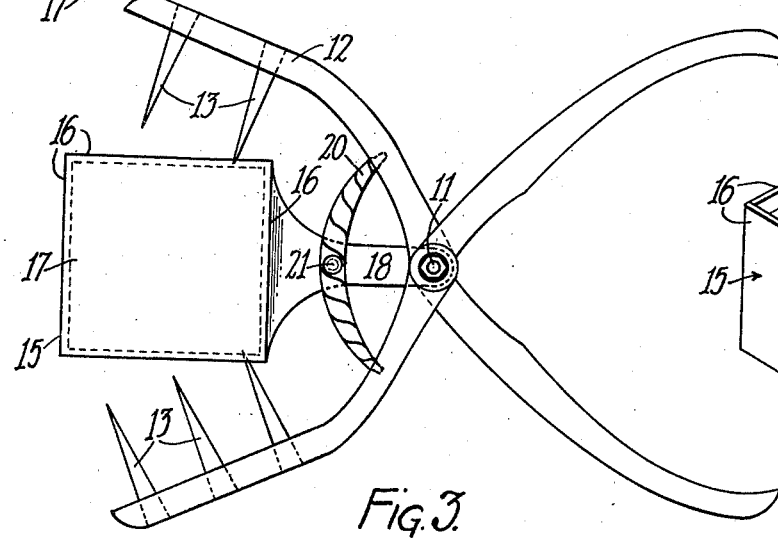
INVENTOR.
ALOIS ADAMCZYK
BY
John J. Lynch ATTORNEY.

Patented Jan. 4, 1938

2,104,577

UNITED STATES PATENT OFFICE 2,104,577

ICE CUBE CRUSHER

Alois Adamczyk, Bethlehem, Pa.

Application June 11, 1937, Serial No. 147,657

1 Claim. (Cl. 83—63)

This invention relates to an ice cube crusher and in particular in an implement that can be operated in one hand to pick up the cubes of ice, crush them and drop the shattered cube into a glass or other receptacle without the necessity of touching the cube with the hands.

A particular object of the invention is to provide a device of the character referred to which is simple in construction, efficient in operation, can be manufactured at small cost and eliminates to a large extent the necessity of using the hands to pick up ice cubes and place them in a glass when preparing drinks or the like.

A still further object of the invention is the provision of an implement which is small, compact and easily and quickly operated to effectively crush ice cubes commonly in use as the product of electric refrigerators. The invention contemplates the use of a forceps or pincer like device, the jaws of which are provided with picks or ice cube piercing and shattering spines, which operate within a cup or receptacle in which the ice cube is positioned preparatory to breaking. This cup is affixed in such manner to the implement that it is always positioned centrally between the crushing jaws and can be employed in picking up the cube.

Changes and alterations may be made in the construction shown and described without departing from the principles of the invention or sacrificing its chief advantages; hence such invention is not to be confined to the structures shown since the accompanying drawing is illustrative and in which:

Figure 1 is a plan view of the implement with the open end of the ice cube cup in upward position as it would appear just after the ice cube has been crushed and is ready to be emptied out, Figure 2 is a view in side elevation of the implement as shown in Figure 1, the relative location of the ice crushing picks being illustrated, Figure 3 is a view similar to Figure 1 showing the jaws in open position with the open end of the cube cup downward, and Figure 4 is a view in perspective of the ice cube cup or receptacle showing the side slots or openings through which the picks can pass in crushing the cube.

Referring to the drawing in detail, 10 indicates forcep arms constituting a handle for the implement, which arms may be rounded in cross sectional shape and may be knurled if desired to give a good hand grip. The arms are pivoted to each other by a bolt or rivet 11 and at their outer ends are spread to provide the jaws 12, which move toward each other as the arms forming the handle are compressed by a hand gripping the handle.

The outer surface of each jaw portion 12 is fluted to reduce the weight of the implement, the jaw portions of which must be sufficiently thick to securely hold the picks 13 which are secured therein in any well known manner. It will be noted that the picks are tapered to a sharp point as at 14 and looking at Figure 2, are so arranged that the near jaw has three picks along the side edges and two picks intermediate, while the far jaw has two picks along the side edges and three intermediate. In this way a close arrangement of pick points is possible that will effectively and thoroughly crush the ice cube with a minimum of effort.

The ice cube is held for crushing in a cup 15 of rectangular shape, which may be made from a single piece of heavy sheet steel and bent to provide the sides 16 and end wall 17, one of the side walls 16 being provided with an extension or arm 18 which, through the medium of the bolt 11, is secured to the pivot point of the arms 10, so that the cup can be held between the jaws of the crusher with two of its opposing walls adjacent the jaws 12 that carry the picks. In these adjacent walls of the cup I provide suitable slots or openings through which the picks can extend to crush the ice cube, the slots being indicated by the numeral 19. In order that the jaws of the implement may be normally retained in open position, I employ a flat coiled compression spring 20, the ends of which are secured to each arm in any suitable manner. In order that the ice cube cup 15 may be centrally positioned between the jaws at all times, I provide the cup extension or arm 18 with a rivet pin 21 which engages the mid-section of spring 20 and thus automatically centralizes the cup as the implement is opened or closed. If desired, the edges of the walls of the cup may be slightly flared as at 22 to facilitate the reception of the ice cube within the cup 15 preparatory to crushing.

In operation, the implement is first turned so that the open end 23 of the cup 15 is downward. In this position an ice cube can be picked up by slight pressure on the handles to cause the inner picks to nip and hold the cube. Then the implement is inverted so that the open end of the cup is on top and at this time the handle is fully compressed to crush the ice cube into small particles. Then by again turning the implement the cracked or crushed ice can be poured into a glass. It is evident therefore that the hands do not have to be employed to pick up the ice cube or position it within the crusher and the implement can be easily operated with one hand.

My invention is not to be restricted to the precise details of construction shown since various changes and modifications may be made therein without departing from the scope of the invention or sacrificing its advantages.

What I claim is:

In an ice cube crusher, in combination, a pair of pivoted arms forming a handle, ends on the arms constituting crushing jaws, a cup between the jaws having side openings therein, an extension on the cup attached to the pivotal connection of said arms, a spring for normally retaining said jaws open, a pin connecting said extension with the mid-section of said spring whereby the cup is maintained centrally between said jaws, ice picks on the opposing faces of the jaws arranged to pass through the cup openings to crush an ice cube in the cup and one side of the cup being open for reception and discharge of ice.

ALOIS ADAMCZYK.